Patented June 3, 1930

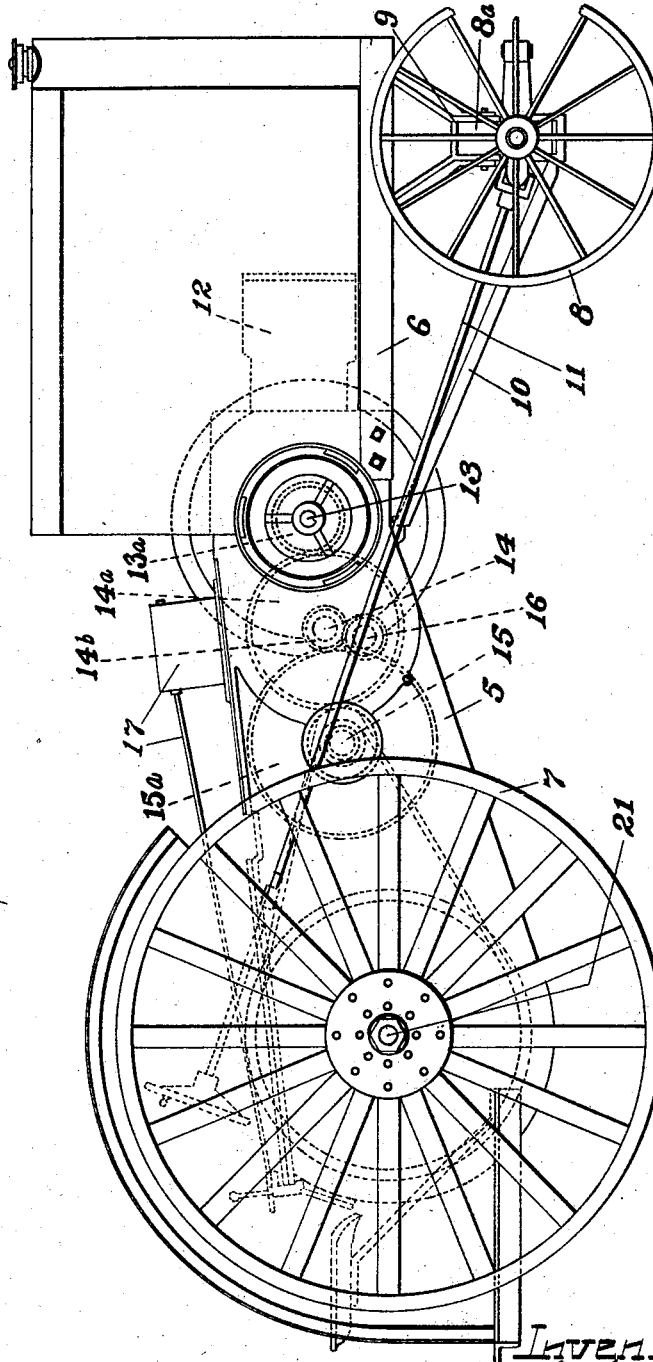

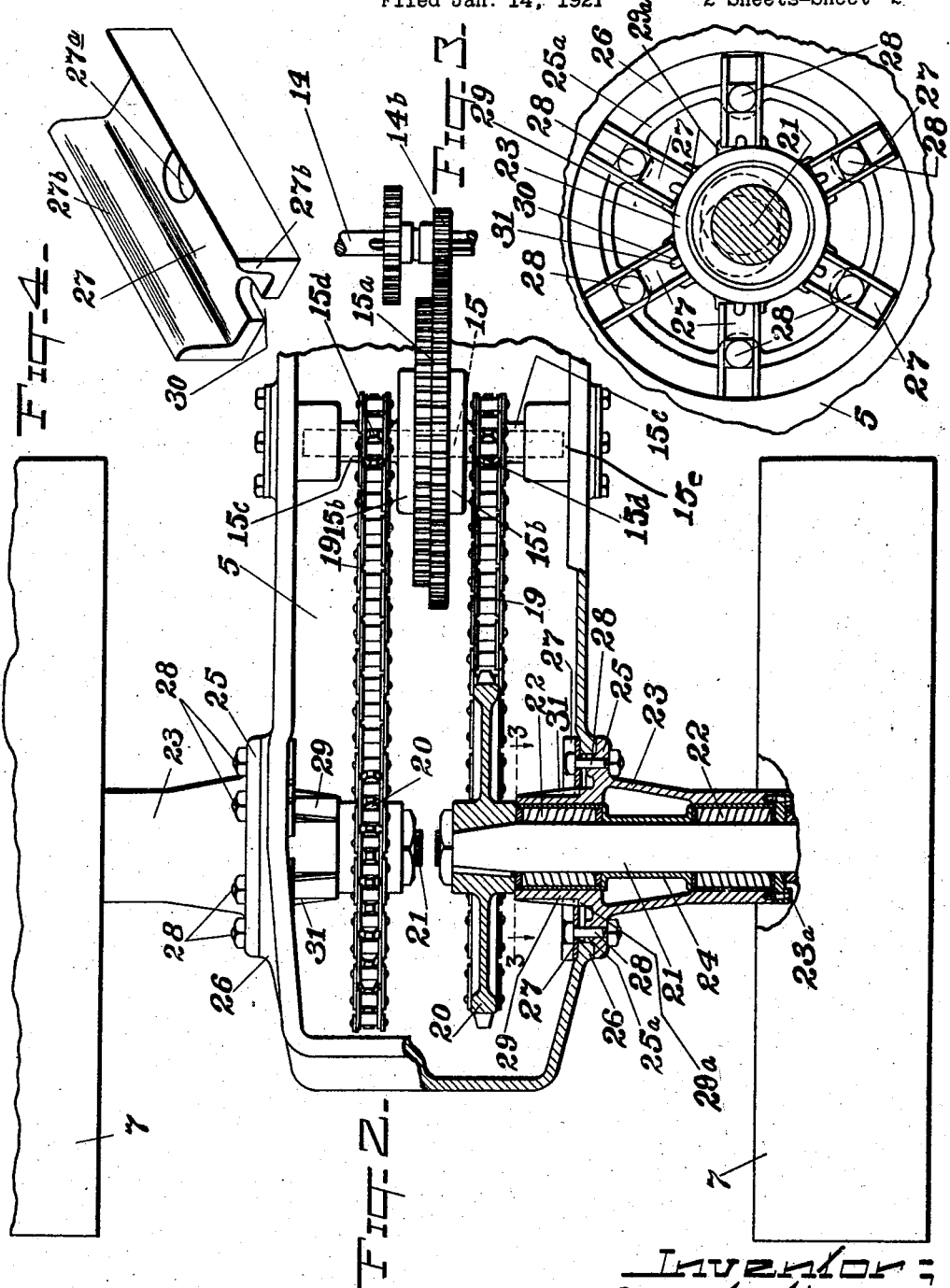

1,760,932

UNITED STATES PATENT OFFICE

LOUIS W. WITRY, OF WATERLOO, IOWA, ASSIGNOR TO JOHN DEERE TRACTOR COMPANY, OF WATERLOO, IOWA, A CORPORATION OF IOWA

TRACTOR

Application filed January 14, 1921. Serial No. 437,287.

This invention relates to tractors, and has for its objects, the provision of improved means for transmitting the motive power to the ground engaging traction wheels; the provision of traction wheel positioning means that may be readily adjusted to shift the traction wheels relative to the tractor frame to regulate the spacing between the wheels and the power shaft from which the traction wheels are driven; and, to improve devices of this character in sundry details, as will be more specifically pointed out in the accompanying specification and the appended claims.

Referring to the drawings, in which like numerals indicate similar parts:

Figure 1 is a side elevation of the improved tractor.

Figure 2 is a detail plan view of the rear portion of the tractor main frame with the top cover removed, some of the parts being shown in section.

Figure 3 is a section on line 3—3 of Figure 2, and

Figure 4 is a view in perspective of one of the clamp members for holding the traction wheel axle sleeves in adjusted position.

The tractor main frame is indicated by the numeral 5, and is a one-piece box-like member entirely housing the driving mechanism. The traction wheels are indicated at 7—7 and are mounted on axles supported in sleeves connected with the main frame 5 in a manner that will be hereinafter more specifically described. The main frame is provided with a forwardly projecting extension 6, which is supported by dirigible front wheels 8 mounted in a well known manner on a front axle $8^a$, the latter being connected with the extension 6 by an upright bracket member 9. A brace 10 extends from the front wheel axle rearwardly to a suitable point of connection with the frame 5. The dirigible front wheels are controlled with the usual hand operated steering rod 11.

The motor that furnishes power for propelling the tractor is indicated at 12 and may be of the internal combustion type.

The motor is secured to the frame 5 and the power thereof is applied to crank-shaft 13 carried in suitable bearings on the frame 5. The power is transmitted from shaft 13 to intermediate drive shaft 14 through the usual gears indicated at $13^a$ and $14^a$. Splined to the intermediate shaft 14 is a stepped gear $14^b$ which can be shifted to a neutral position or to engage with a stepped gear $15^a$ supported by an axle driving shaft 15 mounted in suitable bearings $15^e$ on the frame 5. As shown in Fig. 2, these bearings are in the form of sleeves closed at their outer ends, which are inserted through the side walls of the frame or housing 5 at opposite sides thereof at the proper points to receive and support the end portions of said shaft 15. At its outer end each of said bearings is provided with a closed flanged head $15^f$ that abuts against the outer face of the frame or housing immediately around the opening through which the bearing extends. These heads are secured to the outer surfaces of the walls of the housing by bolts $15^g$. By means of these closed bearings the outer ends of the shaft 15 are enclosed and protected, and by removing the bolts $15^g$ the bearings can be removed laterally through the frame so that the shaft 15 and all the parts mounted thereon can be lifted out of the frame. This is quite an advantage in making repairs to the tractor as well as in assembling the job in the first instance. A countershaft 16 carried by the frame 5 and provided with suitable gears is arranged in a well known manner to reverse the direction of rotation of the power shaft 15 when desired. A common and well known type of hand operated gear shift mechanism, indicated at 17, is provided for engaging the desired set of speed reducing gears or reversing gears carried by the shafts 14, 15 and 16 respectively.

The web of the stepped gear $15^a$ is provided with conventional differential mechanism that co-operates with conventional differential members $15^b$, $15^b$, journaled on shaft 15 either side of the gear $15^a$. The members $15^b$ have outwardly extending sleeve portions $15^c$ on which are formed sprocket teeth $15^d$ that drive sprocket chains 19—19, the latter also operating upon sprocket gears 20—20 secured to independently mounted axles 21—21 to which the traction wheels 7—7 are secured. The axles 21—21 turn in roller bearings 22—22 supported by axle sleeves 23—23, the bearings 22 for each axle being held in spaced relationship in their sleeve 23 by a spreader 24, and held from shifting inwardly by the sprocket gear 20 and from shifting outwardly by collar 23$^a$ secured to the outer end of the sleeve 23.

Each axle sleeve 23 is provided with a circular flange-like bearing 25 the latter having an inward circular extension 25$^a$, the flange and extension fitting snugly a ring-like bearing 26 formed in the side of the frame 5.

The center of the opening through each sleeve 23 for the bearings 22 and axle 21 is not concentric with the center of its flange-like bearing 25—25$^a$; therefore it will be understood that if the sleeve 23 is turned on its flange-like bearing 25—25$^a$ in the bearing 26 of the main frame 5, the axle 21 supported by that sleeve, will by reason of being eccentrically mounted in the sleeve 23, be bodily shifted relative to the main frame, as indicated by dotted lines in Figure 3.

The bearing 25—25$^a$ of the sleeve 23 is normally held fixed relative to the bearing 26 of the main frame by the several clamp members 27 and bolts 28. The bolts 28 extend through web of the flange portion of the sleeve 23, as best seen in Figure 2, and upon each of the bolts 28 and interiorally of the frame 5 is mounted one of the clamp members 27, the bolt extending through a hole 27$^a$ in the clamp member and the head of the bolt fitting between the side walls 27$^b$ of the clamp member, the latter being formed channel-like to prevent the bolt from turning in the clamp member when the nut of the bolt is tightened or loosened. The face of each of the clamp members 27 at one end engages the face of a shoulder 29$^a$ formed on the hub 29 of the sleeve 23 and at the other end engages the inner face of the ring-like bearing portion 26 of the main frame, and it will be readily understood that when the bolts 28 are tightened the clamp action set up by the member 27 will securely hold the member 23 to the frame and prevent it from turning.

Each of the clamp members is provided with a recess 30 at one of its ends, the recess fitting a rib 31 formed on the hub 29 of the axle sleeve, thus the clamp members are held from swinging out of position when the bolts 28 are loosened.

The lower rear interior portion of the frame 5 provides a pit for lubricating oil in which the sprockets 20 and the chains 19 run, the chains conveying lubricant to the teeth of the sprockets 18. When in time it is desired to take up slack in the drive chains, replace worn links or adjust the tension of the chains for any reason, this can readily be done by jacking up the rear end of the tractor to take the weight off the wheels and then loosening the bolts 28 which clamp the sleeves 23 to the frame whereupon the sleeves 23 can be turned in their bearings. When either sleeve is turned in its frame bearing the wheel axle supported in that sleeve will, by reason of its being mounted eccentrically in the sleeve, be bodily moved around the true center of the frame bearing and thus the axle, its traction wheel 7, and the sprocket 20, mounted thereon, will be shifted toward or from its driving sprocket 15$^d$, depending upon the direction the sleeve is turned. When the desired adjustment is obtained the bolts 28 are again tightened and the clamp members 27 then hold the sleeves securely relative to the frame. As each sleeve is adjustable independently of the other, the tension of the drive chains can be closely regulated to compensate for wear that may occur in either driving unit.

It will be noted that when the axle sleeve is adjusted relative to the frame, the clamp bolts 28 are not removed from the flange-like bearing 25 but are left in place, although loosened, and as the bolts are mounted in the flange-like bearing to turn therewith, they are always in position and properly spaced to act as an effective clamping and holding agency when tightened.

What I claim is:—

1. A tractor comprising a housing having side walls, differential mechanism mounted in said housing, axle members extending through and supported wholly by said side walls, bearings for said axle members, devices operable to adjust said bearings to move said axle members toward or from said differential mechanism, traction wheels driven by said axle members, sprocket wheel and chain mechanisms separately connecting said axle members with said differential mechanism for driving said axle members, and means independent of said sprocket wheel and chain mechanisms for driving said differential mechanism.

2. A tractor comprising a housing having side walls, differential mechanism mounted in said housing, axle members extending through and supported wholly by said side walls, bearings for said axle members, devices operable from outside the housing to adjust said bearings to move said axle members toward or from said differential mechanism, traction wheels driven by said axle members, sprocket wheel and chain mechanisms separately connecting said axle members with said differential mechanism for driving said axle members, and means independent of said sprocket wheel and chain mechanisms for driving said differential mechanism.

3. A tractor comprising a housing having side walls, differential mechanism mounted in a fixed position in said housing, axle members extending through and supported wholly by said side walls, bearings for said axle members, devices operable to adjust said bearings to move said axle members toward or from said differential mechanism, traction wheels driven by said axle members, driving sprocket wheels at opposite sides of said differential mechanism in fixed relation thereto and driven thereby, sprocket wheels and chains connecting said driving sprocket wheels with said axle members respectively, for driving the latter from said differential mechanism, and means independent of said sprocket wheels and chains for driving said differential mechanism.

4. A tractor comprising a housing having side walls, differential mechanism mounted in a fixed position in said housing, driving sprocket wheels at opposite sides of said differential mechanism in fixed relation thereto and driven thereby, means for driving said differential mechanism, axle members extending respectively through the opposite walls of the housing, traction wheels driven by said axle members, bearings for said axle members, sprocket wheels mounted on said axle members between the inner ends thereof and said bearings, and alined with said driving sprocket wheels respectively, and means supporting the bearing of each axle member on a side wall of the housing and adjustable to move such axle member and the sprocket wheel thereon toward or from the driving sprocket wheel connected therewith.

5. A tractor comprising a housing having side walls, differential mechanism mounted in a fixed position in said housing, driving sprocket wheels at opposite sides of said differential mechanism in fixed relation thereto and driven thereby, means for driving said differential mechanism, axle members extending respectively through the opposite walls of the housing, traction wheels driven by said axle members, inner and outer bearings for said axle members, sprocket wheels mounted on said axle members between the inner ends thereof and said inner bearings, and alined with said driving sprocket wheels respectively, and means supporting the bearings of each axle member on a side wall of the housing and adjustable to move such axle member and the sprocket wheel thereon toward or from the driving sprocket wheel connected therewith.

6. In a tractor, the combination of a frame having side walls, differential mechanism, rear axle members, bearing supporting members supported wholly on the side walls of said frame for rotary adjustment, bearings for said axle members eccentrically mounted in said bearing supporting members, traction wheels mounted on said axle members, sprocket wheel and chain mechanisms connecting said axle members respectively with said differential mechanism, and means independent of said sprocket wheel and chain mechanisms for driving said differential mechanism.

7. A tractor comprising a housing having side walls, differential mechanism mounted in said housing, axle members extending through and supported wholly by said side walls, bearings for said axle members, sleeves in which said axle bearings are mounted, said sleeves extending through the opposite side walls of the housing and each having a bearing thereon eccentric with the axis of the bearing of the axle member mounted therein, and having external flanges bearing on the side walls of the housing, means for securing said sleeves in different positions of adjustment, traction wheels driven by said axle members, sprocket wheel and chain mechanisms separately connecting said axle members with said differential mechanism for driving said axle members therefrom, and means independent of said sprocket wheel and chain mechanisms for driving said differential mechanism.

8. In a tractor, the combination of a housing frame comprising side walls having apertures therein, sleeves having peripheral bearings rotatably supported in said apertures at each side of said housing, a peripheral flange carried by each sleeve and bearing against the outer side of said housing wall around its associated aperture, clamping members bearing against the opposite side of said housing wall around each aperture, bolts passing through each flange and having engagement with the associated clamping members for clamping each sleeve in its adjusted setting, axle bearings mounted in said sleeves eccentrically with respect to the peripheral bearings thereof, a traction wheel mounted on the outer end of each axle, power transmitting mechanism supported within said housing frame, and a sprocket wheel and chain driving connection between said power transmitting mechanism and the inner end of each axle.

9. In a tractor, the combination of a housing frame, power transmitting mechanism supported within the frame, means for driving the power transmitting mechanism, a sleeve rotatably supported in an opening in a side wall of the frame, a peripheral flange carried by the sleeve and adapted to fit against the outer face of said side wall, bolts extending through said flange and opening, clamp members within the frame and adapted to be drawn by said bolts against the inner face of said side wall around said opening, means for holding said clamp members from swinging out of position when the bolts are loosened, an axle eccentrically mounted in said sleeve, a traction wheel mounted on said axle, and a driving connection between the power transmitting mechanism and the traction wheel.

10. In a tractor, the combination of a boxlike housing frame for the rear portion of the tractor, said frame having relatively large apertures in the side walls thereof, bearing sleeves rotatably supported in said apertures at each side of said housing, two rear axles eccentrically mounted within said bearing sleeves, a traction wheel mounted on the outer end of each axle, a sprocket on the inner end of each axle within said housing frame, a differential within said housing frame, driving sprockets associated with said differential, chains connecting said driving sprockets with the sprockets on said axles, the rotation of said bearing sleeves in said apertures serving to shift said axles fore and aft relatively to the housing frame and independently of each other for adjusting the tension of said chains, and means for securing each of said bearing sleeves in its desired angular setting comprising a flange on each bearing sleeve adapted to have clamping engagement against one side of the wall of said housing frame, a plurality of clamp members located at radially spaced points around each bearing sleeve and adapted to have clamping engagement with the opposite side of the housing wall, the inner end of each of said clamp members bearing against a shoulder on said sleeve and the outer end thereof bearing against the wall of said housing, and bolts passing through said clamping flange and the enlarged aperture in the adjacent housing wall and having engagement with said clamping members.

11. In a tractor, the combination of a box-like housing frame for the rear portion of the tractor, power transmitting mechanism supported within said frame, a differential within said frame and driven from said power transmitting mechanism, said housing frame having relatively large apertures in the side walls thereof, bearing sleeves rotatably supported in each of said apertures on the opposite sides of said frame, oppositely extending axles eccentrically mounted within said bearing sleeves, a traction wheel mounted on the outer end of each axle, a sprocket on the inner end of each axle within said housing frame, driving sprockets associated with said differential, chains connecting said driving sprockets with the sprockets on the inner ends of said axles, the rotation of said bearing members within said apertures serving to shift said axles fore and aft relatively to said housing frame and independently of each other for loosening or tightening said chains, and means for securing each of said bearing sleeves in its desired angular setting comprising a clamping flange on each sleeve bearing against the outer side of the adjacent side wall of the housing, a plurality of channel-shaped clamping members located at radially spaced points around each bearing sleeve within said housing, the inner end of each clamping member bearing against a shoulder on said sleeve, and the outer end thereof bearing against the inner side of the housing wall, bolts passing through said clamping flange and through the aperture in the adjacent housing wall and having heads non-rotatably engaging between the flanges of said channel-shaped clamping members and nuts screwing over the outer ends of said bolts on the outer side of said clamping flange.

12. In a tractor, the combination of a lubricant containing transmission case, a transmission therein comprising a differential, a pair of traction wheels mounted on axles supported in bearings mounted directly on the case and capable of rotary adjustment with respect thereto, the axis of rotary adjustment of each bearing being eccentric with respect to the axis of rotation of its corresponding wheel, and an individual chain drive from the differential for driving each traction wheel, disposed within the case and adjustable by rotary adjustment of the corresponding bearing.

13. In a tractor the combination of a lubricant containing transmission case, a transmission therein comprising a differential, a pair of traction wheels mounted on axles supported in bearings mounted directly on the case and capable of rotary adjustment with respect thereto, the axis of rotary adjustment of each bearing being eccentric with respect to the axis of rotation of its corresponding wheel, an individual chain drive from the differential for driving each traction wheel, disposed within the case and adjustable by rotary adjustment of the corresponding bearing, and clamping means externally operable for releasing said bearings for adjustment, and for again clamping the same after adjustment.

14. In combination, a lubricant containing transmission case comprising a chassis frame having two separate axle housings rigidly connected thereto, wheels rotatably mounted on said axle housings, a separate driving device for each rear wheel, disposed within the case, said axle housings providing bearings which are rotarily adjustable with respect to the case, said bearings having axes of rotary adjustment eccentric with respect to the axis of rotation of the wheels for securing individual adjustment of the separate driving devices.

LOUIS W. WITRY.